April 19, 1955  F. I. STEWART  2,706,416
POWERED UNIT FOR ENDLESS CONVEYOR CABLES
Filed July 21, 1952  3 Sheets-Sheet 1

Felix I. Stewart
INVENTOR.

BY *Clarence A. O'Brien*
*and Harvey B. Jacobson*
Attorneys

April 19, 1955   F. I. STEWART   2,706,416
POWERED UNIT FOR ENDLESS CONVEYOR CABLES
Filed July 21, 1952   3 Sheets-Sheet 2
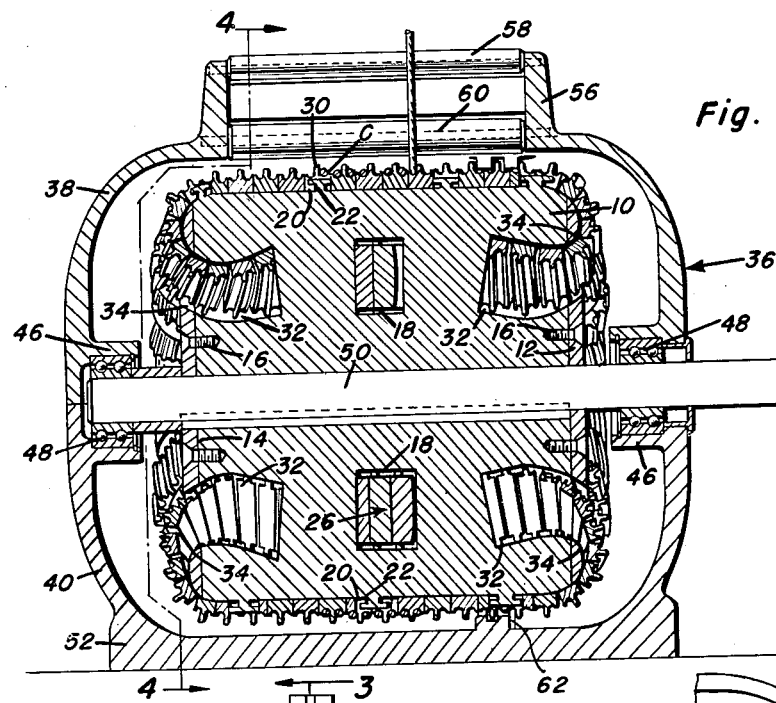
Fig. 3
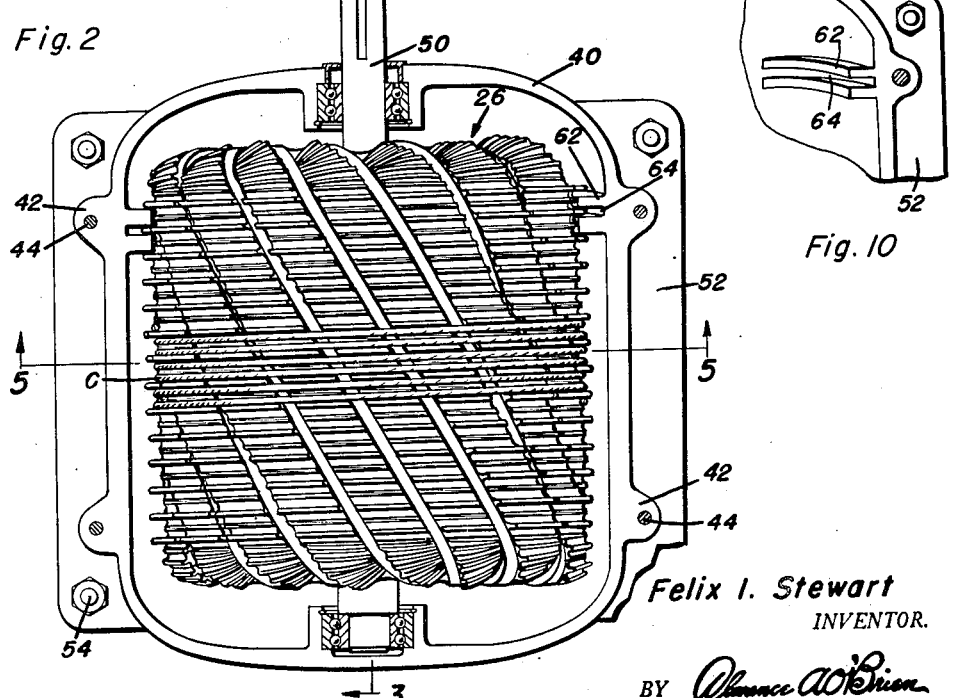
Fig. 2
Fig. 10
Felix I. Stewart
INVENTOR.
BY Clarence A. O'Brien
and Harvey B. Jacobson
Attorneys April 19, 1955  F. I. STEWART  2,706,416
POWERED UNIT FOR ENDLESS CONVEYOR CABLES
Filed July 21, 1952  3 Sheets-Sheet 3

Felix I. Stewart
INVENTOR.

BY *Clarence A. O'Brien*
*and Harvey B. Jacobson*
Attorneys

United States Patent Office 2,706,416
Patented Apr. 19, 1955

2,706,416

POWERED UNIT FOR ENDLESS CONVEYOR CABLES

Felix I. Stewart, Huntsville, Ala.

Application July 21, 1952, Serial No. 300,045

10 Claims. (Cl. 74—224)

This invention relates to new and useful improvements in power units for conveyors and the primary object of the present invention is to provide a power unit for endless conveyor cables so constructed as to permit the portion of a cable being played off of a drum to be tensioned substantially equal to the portion of the cable being engaged about the drum.

Another important object of the present invention is to provide a power unit for endless conveyor cables including a cylinder having slidable travelers that will slide in response to rotation of the cylinder and winding and unwinding of portions of a cable disposed about the cylinder and engaged with the travelers.

A further object of the present invention is to provide a power unit wherein the travelers or lugs are of rigid construction to assume the wear normally assumed by the periphery of the cylinder, and which lugs may be quickly and readily removed or replaced in a convenient manner.

A still further aim of the present invention is to provide a powered unit for endless conveyor cables, especially of the overhead type, used in conveying logs, and which unit is simple and practical in construction, strong and reliable in use, small and compact in structure, efficient and durable in operation, inexpensive to manufacture, assemble and disassemble, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a top plan view of the invention and showing the upper portion of the casing removed;

Figure 3 is a vertical sectional view taken substantially on the plane of section line 3—3 of Figure 2;

Figure 10 is an enlarged detailed view of a portion of the guide lugs; and

Figure 1:
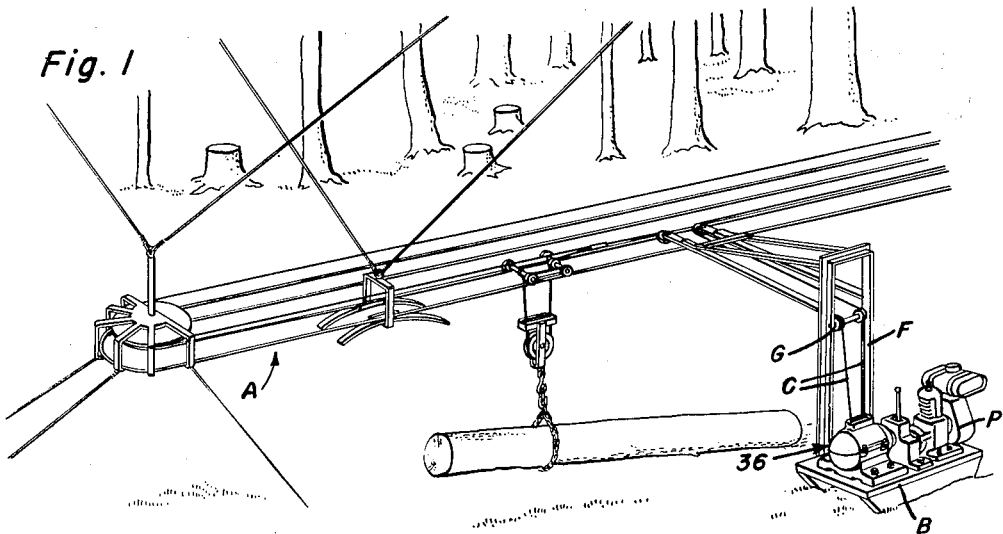
Figure 1 is a diagrammatic perspective view showing the invention in use.
Figure 6:
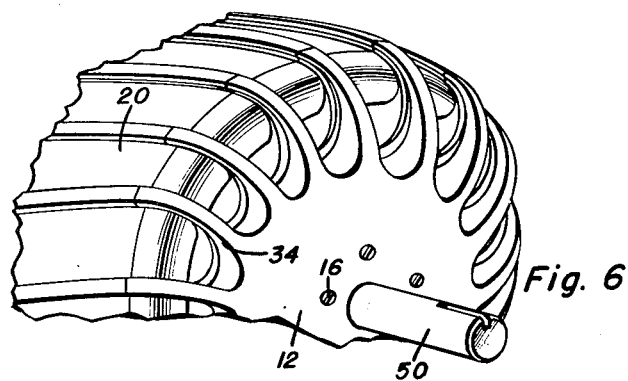
Figure 6 is a fragmentary perspective view of the power driven cylinder with the cable engaging lugs removed.
Figure 7:
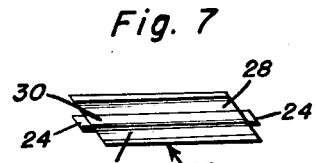
Figure 7 is a plan view of one of the cable engaging lugs.
Figure 8:
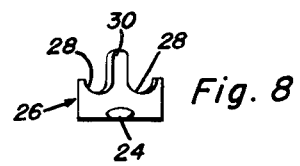
Figure 8 is an end view of Figure 7.

Referring now to the drawings in detail, wherein, for the purpose of illustration, there is disclosed a preferred embodiment of the present invention, the numeral 10 represents a solid cylinder having removable end plates 12 and 14 that are secured to the flat end surfaces of the cylinder by fasteners 16.

The cylinder 10 is provided with a plurality of guides in the form of bores 18 and external channels or guide tracks 20. The side edges of the channels 20 are undercut to form keyways 22 that will slidably receive the end protuberances or keys 24 of slidable travelers or cable engaging lugs 26. The upper faces of the lugs 26 are provided with a pair of spaced, parallel, longitudinally extending grooves 28 that are concave in transverse cross-section to form seats for a cable.

The lugs 26 are of any suitable rigid material, such as metal, having a relatively high resistance to wear in order to increase the efficient use of these lugs. The number of grooves 28 in each lug may be increased or reduced, although two of these grooves has proven to be quite practical. The lugs 26 are formed with central longitudinal ribs 30 on their upper faces between the grooves and these ribs constitute means preventing a cable portion in one groove 28 from slipping therefrom and into the other groove 28 during use of the invention.

The channels 20 are of uniform depth throughout their lengths and extend into the periphery of the cylinder from one end of the cylinder to the other end thereof. The channels 20 are spaced from each other an equal distance throughout their lengths and the channels are inclined relative to the longitudinal axis of the cylinder as shown in Figure 2.

The bores or slots 18 extend through the cylinder 10 and follow the direction of their companion guide-forming channels 20. The bores 18 are spaced apart an equal distance throughout their lengths. The bore and channel of one guide are equal to the bore and channel of an adjacent guide so that the lugs 26 in each guide will move uniformly in a manner presently to be described.

Figure 9:
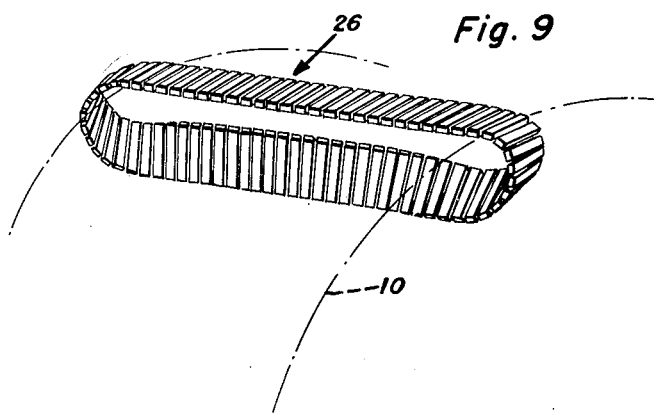
Figure 9 is a diagrammatic perspective view showing the manner in which one of the carrier units is related to the driven cylinder.
Figure 11:
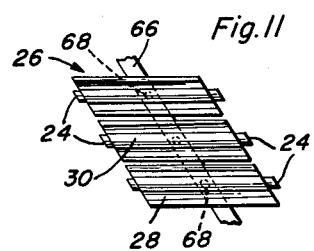
Figure 11 is a perspective view of a modified form of the cable engaging lugs.
Figure 4:
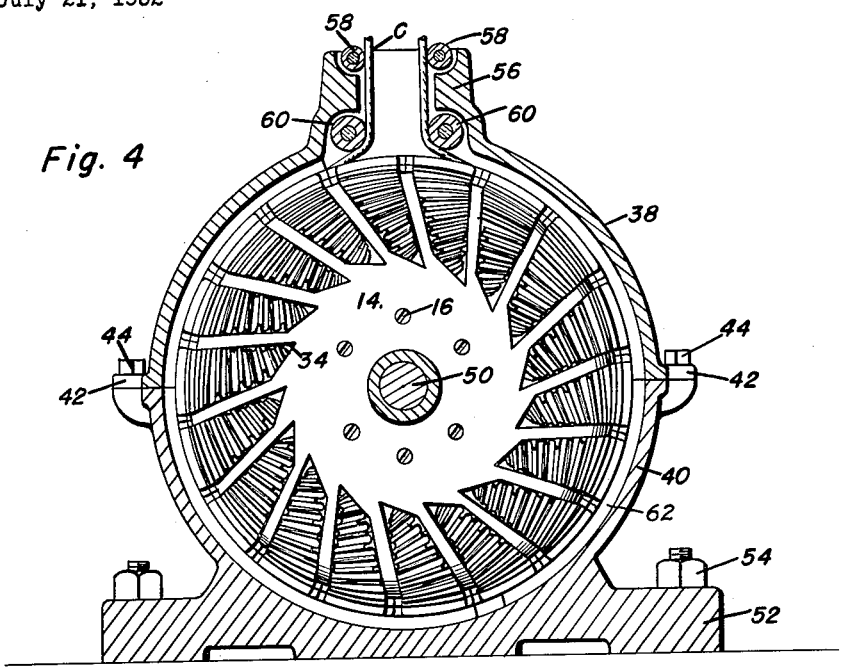
Figure 4 is a vertical sectional view taken substantially on the plane of broken section line 4—4 of Figure 3.
Figure 5:
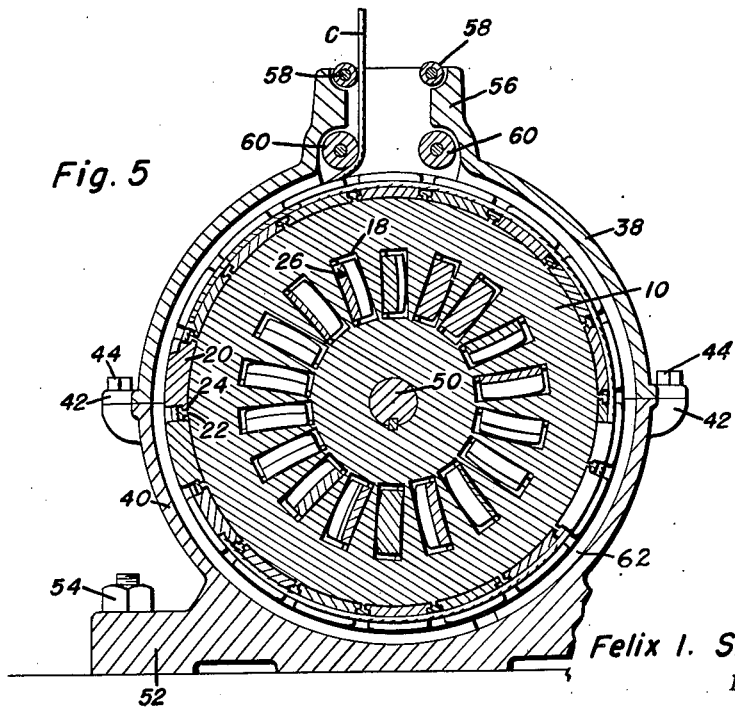
Figure 5 is a vertical sectional view taken substantially on the plane of section line 5—5 of Figure 2.

The intermediate portions of the bores 18 are substantially rectangular in cross-section with their axes disposed radially of the cylinder as shown in Figure 5. The end portions 32 of the bores 18 are smoothly rounded (Fig. 3) or twisted approximately 90° so that as the lugs enter the bores they will be turned 90° and as the lugs pass from the bores they will again be turned 90° and to their original positions as emphasized in Figure 9.

End plates 12 and 14 are provided with openings 34 that form continuations of the guide channels 20 and the bores 18. These openings 34 follow the gradual curve of the end portions 32 and the side edges of the openings 34 are undercut like the channels to slidably receive the lugs 24 to retain the lugs in their guides as the lugs pass through the openings 34 and into the bores.

When the lugs are disposed within the channels 20 the grooves 28 will extend longitudinally of the cylinder 10 and the grooves in the lugs received in one channel will be aligned with the grooves in the lugs of an adjacent channel as shown in Figure 2. The lugs may be placed in or removed from their accommodating guides upon removal of the end plates 12 and 14.

Means is provided for housing and rotatably supporting the cylinder 10 and its associated parts. This means comprises a casing 36 composed of upper and lower shell-forming members 38 and 40 whose open ends are formed with ears 42. The ears 42 of member 38 are secured to the complemental ears 42 of member 40 by fasteners 44.

Bearing seats or sockets 46 are formed on the members 38 and 40, and accommodate bearing units 48. A power-driven shaft 50 is keyed axially within the cylinder 10 and its ends are journaled for rotation in the bearing units. One end of shaft 50 extends outwardly from the casing 36 to be operatively coupled to a power plant P. Member 40 is formed with a flanged base 52 that is removably secured, by fasteners 54, to the supporting base B of the power plant P (Fig. 1).

Upper member 38 is formed with an upwardly extending sleeve portion 56 in which upper and lower pairs of horizontal guide rollers 58 and 60 are suitably mounted for rotation.

The inner wall of member 36 is formed with curved guide lugs 62 (Figures 2, 3 and 10) adjacent one end having curved slots 64 that will receive the ribs 30 during rotation of the cylinder 10 to advance the lugs of each group of lugs one at a time during rotation of the cylinder. As the cylinder 10 rotates ribs 30 will engage in the slot 64 and continued rotation of the cylinder 10 will cause the lugs 26 to be moved longitudinally of the cylinder 10 due to the curvature of the slot 64.

The invention is primarily adapted for use with the overhead endless conveyor cables of log carrying apparatus, designated generally by the letter A in Figure 1, which apparatus includes an endless cable C that extends over guides G on a frame F mounted on base B.

Cable C extends through sleeve portion 56 and is wrapped about the cylinder 10 several times to include convolutions that enter the aligned grooves 28 of certain lugs of each group of lugs as shown in Figure 2.

As the cylinder is rotated by the power plant to move the cable onto and play the cable from the cylinder, the lugs 26 shifting in the same direction will prevent slack from occurring in the cable and will permit the portion of cable C going onto the drum to be tensioned substantially the same as the portion of the cable leaving the drum.

Instead of having individual lugs, the lugs of each group may be secured to flexible carrier strips that ride in the channels and the bores. The ends of the strips may be suitably secured together to slide in the guides similar to the abutting contact of the adjacent lugs of each group of lugs shown. In such a case an endless flexible strip 66 extends between the lugs 26 and is secured to each lug by a fastener 68.

Having described the invention, what is claimed as new is:

1. A power unit for conveyors, said power unit comprising a power-driven cylinder, said cylinder having a plurality of spaced parallel guide tracks on its outer periphery that are inclined relative to the longitudinal axis of the cylinder, said cylinder also having a plurality of radial slots including ends disposed at the ends of the cylinder, flexible endless carrier strips slidably engaging the guide tracks and extending through the slots, and guide lugs on the strips and movable therewith, the lugs on the portion of one strip that is engaged with the tracks being aligned with the lugs on the portion of an adjacent strip that is engaged with the tracks.

2. A power unit for conveyors, said power unit comprising a power-driven cylinder, said cylinder having a plurality of spaced parallel guide tracks on its outer periphery that are inclined relative to the longitudinal axis of the cylinder, said cylinder also having a plurality of radial slots including ends disposed at the ends of the cylinder, flexible endless carrier strips slidably engaging the guide tracks and extending through the slots, and guide lugs on the strips and movable therewith, the lugs on the portion of one strip that is engaged with the tracks being aligned with the lugs on the portion of an adjacent strip that is engaged with the tracks, the ends of said slots being curved to twist the strips as the strips move into and from the slots.

3. A power unit for conveyors, said power unit comprising a power-driven cylinder having a plurality of spaced parallel guide tracks on its outer periphery that extend from one end of the cylinder to the other end of the cylinder, said tracks being inclined relative to the axis of the cylinder, said cylinder also having a plurality of slots therein paralleling the guide tracks and having open end portions at the ends of the cylinder, endless flexible carrier strips extending through the slots and slidably engaged with the guide tracks, and a plurality of cable engaging lugs attached to each strip, said lugs each having a groove disposed longitudinally of the cylinder when the lugs are disposed on the periphery of the cylinder, the lugs of one strip that are disposed on the outer periphery of the cylinder being aligned with the lugs of an adjacent strip that are disposed on the outer periphery of the cylinder.

4. A power unit for conveyors, said power unit comprising a power-driven cylinder having a plurality of spaced parallel guide tracks on its outer periphery that extend from one end of the cylinder to the other end of the cylinder, said tracks being inclined relative to the axis of the cylinder, said cylinder also having a plurality of slots therein paralleling the guide tracks and having open end portions at the ends of the cylinder, a plurality of cable engaging lugs slidably engaged with the tracks and extending through the slots, said lugs being moved as a unit along the tracks and through the slots, each of said lugs having a groove therein, the grooves of the lugs engaged with the tracks extending longitudinally of the cylinder.

5. A power unit for conveyors, said power unit comprising a power-driven cylinder having a plurality of spaced parallel guide tracks on its outer periphery that extend from one end of the cylinder to the other end of the cylinder, said tracks being inclined relative to the axis of the cylinder, said cylinder also having a plurality of slots therein paralleling the guide tracks and having open end portions at the ends of the cylinder, a plurality of cable engaging lugs slidably engaged with the tracks and extending through the slots, said lugs being moved as a unit along the tracks and through the slots, each of said lugs having a groove therein, the grooves of the lugs engaged with the tracks extending longitudinally of the cylinder, the ends of said tracks curving to meet the end portions of said slots and the intermediate portions of said slots being disposed radially of the cylinder, whereby the lugs in the intermediate portions of the slots will be disposed perpendicular to the lugs engaged with the tracks.

6. A power unit for conveyor cables comprising a power-driven cylinder having a plurality of peripheral guide channels, and lugs slidably engaged in said channels and having cable receiving grooves, said channels being inclined relative to the axis of the cylinder.

7. A power unit for conveyor cables comprising a power-driven cylinder having a plurality of spaced parallel guide channels in its outer periphery that extend between the ends of the cylinder, said cylinder having a plurality of bores joining the ends of the channels, said channels and said bores being inclined relative to the axis of the cylinder, a group of lugs slidably received in each channel and the bores connecting the ends of the channels, each of said lugs having a groove, the grooves in the lugs of one group of lugs in one channel being aligned with the grooves in the lugs of an adjacent group of lugs in an adjacent channel and extending longitudinally of the cylinder.

8. A power unit for conveyor cables comprising a power-driven cylinder having a plurality of spaced parallel guide channels in its outer periphery that extend between the ends of the cylinder, said cylinder having a plurality of bores joining the ends of the channels, said channels and said bores being inclined relative to the axis of the cylinder, a group of lugs slidably received in each channel and the bores connecting the ends of the channels, each of said lugs having a groove, the grooves in the lugs of one group of lugs in one channel being aligned with the grooves in the lugs of an adjacent group of lugs in an adjacent channel and extending longitudinally of the cylinder, the adjacent lugs of each group of lugs being in close contact with each other to slide as a unit in their accommodating channel and bore.

9. A power unit for conveyor cables comprising a power-driven cylinder having a plurality of spaced parallel guide channels in its outer periphery that extend between the ends of the cylinder, said cylinder having a plurality of bores joining the ends of the channels, said channels and said bores being inclined relative to the axis of the cylinder, a group of lugs slidably received in each channel and the bores connecting the ends of the channels, each of said lugs having a groove, the grooves in the lugs of one group of lugs in one channel being aligned with the grooves in the lugs of an adjacent group of lugs in an adjacent channel and extending longitudinally of the cylinder, the adjacent lugs of each group of lugs being in close contact with each other to slide as a unit in their accommodating channel and bore, the ends of said channels being laterally curved to meet the ends of the bores, said bores having radially disposed intermediate portions that are disposed perpendicular to their associated channels, whereby the lugs passing through a bore will be disposed perpendicular to the lugs passing through the channel associated with this bore.

10. A power-driven cable drum for endless conveyor cables, said drum including a cylinder having a plurality of guides, each guide comprising an external channel and a bore, the ends of the channel being connected to the ends of the bore, said channels and said bores being inclined relative to the axis of the cylinder, a plurality of abutting traveler lugs slidably received by each guide and each having a cable receiving groove, the grooves of the lugs received in one of the channels being aligned with the grooves of the lugs in an adjacent channel and extending longitudinally of the cylinder.

References Cited in the file of this patent

UNITED STATES PATENTS 750,920     Wagner               Feb. 2, 1904